June 16, 1925.
W. D. HENRY
TOWING TONGUE
Filed June 3, 1921
1,542,769
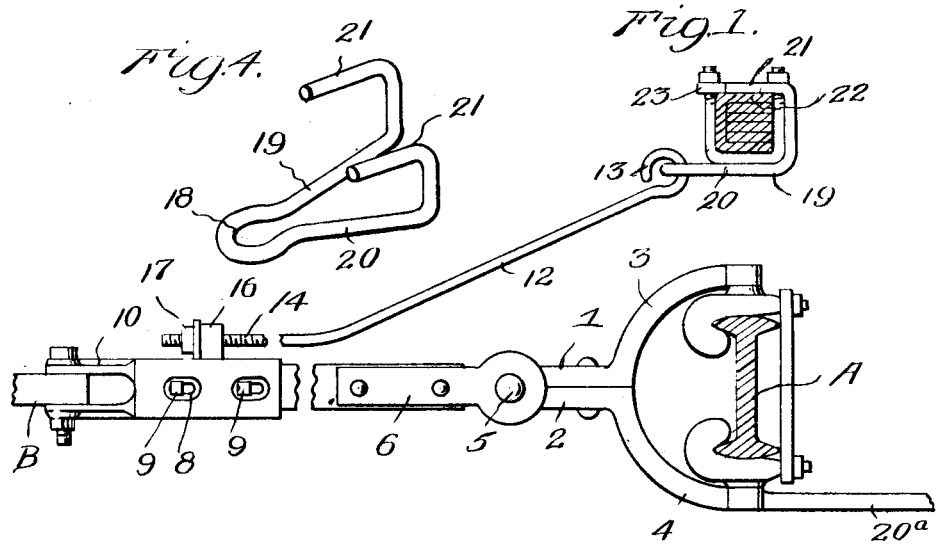
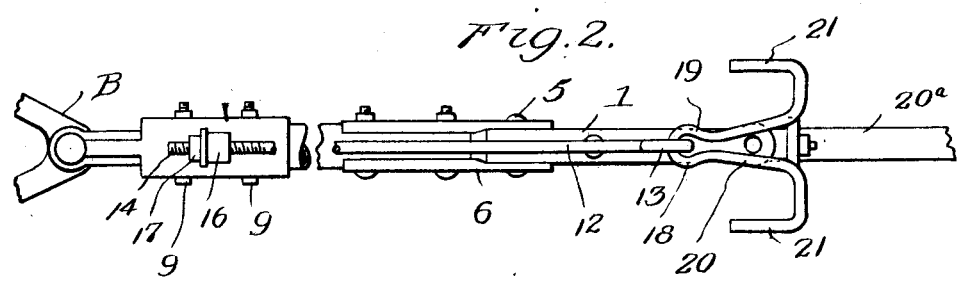
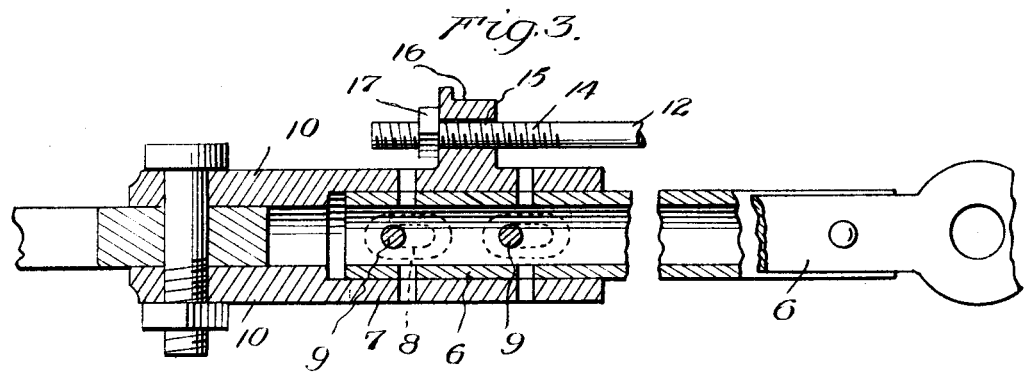
W. D. HENRY
INVENTOR
BY Victor J. Evans
ATTORNEY Patented June 16, 1925.

1,542,769

UNITED STATES PATENT OFFICE.

WILLIAM D. HENRY, OF GREENVILLE, ILLINOIS.

TOWING TONGUE.

Application filed June 3, 1921. Serial No. 474,831.

*To all whom it may concern:*

Be it known that I, WILLIAM D. HENRY, a citizen of the United States, residing at Greenville, in the county of Bond and State of Illinois, have invented new and useful Improvements in Towing Tongues, of which the following is a specification.

This invention relates to towing tongues or couplings and an object of the invention is to provide a towing tongue which may be used in connection with disabled motor vehicles for towing trailers or the like, and one which may be quickly and easily attached to the front axle of the vehicle to be towed.

Another object of this invention is to provide a towing tongue as specified which is an improvement over the towing tongue disclosed in Letters Patent 1,475,117 issued to me Nov. 20, 1923, which improvement embodies means for relieving the strain from the front axle of the vehicle being towed, and also includes means, in the form of a clevis adapted for attachment to the pole or tongue shown in the application just mentioned, and designed for the purpose of making a quick hitch on the pulling or towing vehicle.

More specifically, the invention comprehends the provision of a towing tongue structure including, in combination with clamping means for engagement with the front axle of a vehicle to be towed, means for connecting the towing tongue to other parts of the vehicle for distributing the strain.

Other objects of the invention will appear in the following detailed description and in the accompanying drawing wherein:

Fig. 1 is a side elevation of the improved features of my towing tongue showing it applied.

Fig. 2 is a top plan of the improved towing tongue.

Fig. 3 is an enlarged detail section through the towing tongue.

Fig. 4 is a detail perspective view of a part of the towing tongue structure.

Referring more particularly to the drawing the improved towing tongue structure includes sections 1 and 2, the arms 3 and 4 of which are adapted for connection to the front axle A of a vehicle to be towed and these sections 1 and 2 are pivotally connected as shown at 5 to a tongue or pole 6 which extends into a suitable clevis 7. The clevis 7 is provided with a plurality of diametrically opposed longitudinally extending slots 8 through which bolts 9 extend and the bolts 9 also extend through the tongue 6, connecting the tongue to the clevis 7 in such a manner as to permit limited longitudinal movement of the clevis 7 relative to the tongue or pole and to the axle A. The clevis 7 is provided with spaced arms 10 and with a bolt or pin adapted to engage a suitable hitch as shown at B by means of which the improved towing tongue may be quickly and easily connected to a pulling or towing vehicle. With the tongue 6 and clevis 7 connected directly to the axle A all of the strain of towing the vehicle of which the axle A is a part, would be borne by the axle and to permit distribution of such strain, a draw rod 12 is provided which has a hook 13 on one end and has its opposite end threaded as shown at 14, the threaded end 14 extends through an opening 15 in an upstanding block 16 which is formed upon the clevis 10. The nut 17 is threadably mounted upon the threaded end 14 of the draw rod 12 and is adapted to abut the upstanding block or projection 16 to properly adjust the active length of the draw rod 12. The hooked end 13 of the draw rod 12 engages through an eye 18 formed upon a connecting hook structure 19. The connecting hook structure 19 is formed of a single length of relatively strong and suitable material and it has spaced horizontal portions 20 and 21, the former of which are adapted to engage beneath the spring housing 22 of a motor vehicle while the ends 21 engage across the upper surface of the housing 22 and against the ends of the engine support 23 thereby distributing, if desired, all of the towing strain from the axle A to the engine support, spring, and spring housing.

The arm 20ª is adapted to be connected to the steering mechanism of the vehicle to be towed which structure is more specifically described in my companion application heretofore mentioned.

Like the towing tongue disclosed in my companion application the improved structure may be taken apart to permit it to be packed in a relatively small space so that it can be conveniently carried by a motor vehicle for emergency use and it will also be apparent from the foregoing description in connection with the accompanying drawing that a towing tongue for vehicles has been provided which may be utilized for towing trailers as well as for towing disabled vehicles and one which, with slight alterations, may be adapted for use on any approved type of motor vehicles.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A towing tongue comprising a pole connected to the vehicle axle and consisting of two parts having relative longitudinal movement, and a draw bar connecting one of the parts to the vehicle spring.

2. A towing tongue comprising a pole swingingly connected to the vehicle axle, a clevis connected to the pole for limited movement thereon, a hook structure for engagement over the vehicle spring, and a draw bar having a flexible connection at one end with the hook structure and detachable connection with the clevis.

In testimony whereof I affix my signature.

WILLIAM D. HENRY.